United States Patent [19]

Lai et al.

[11] 4,131,731

[45] Dec. 26, 1978

[54] PROCESS FOR PREPARING POLYCARBONATES

[75] Inventors: Kwo-Hrong Lai, Lynnfield; Harold N. Silvers, Cambridge, both of Mass.

[73] Assignee: Beatrice Foods Company, Peabody, Mass.

[21] Appl. No.: 867,752

[22] Filed: Jan. 9, 1978

Related U.S. Application Data

[63] Continuation of Ser. No. 739,456, Nov. 8, 1976, abandoned.

[51] Int. Cl.$^2$ .................... C08G 63/62; C08G 18/42; C08G 18/14; C08L 69/00
[52] U.S. Cl. .................................. 528/370; 260/858; 260/859 R; 260/859 PV; 521/189; 528/85
[58] Field of Search .................................. 260/77.5 D

[56] References Cited

U.S. PATENT DOCUMENTS

| | | | |
|---|---|---|---|
| 3,313,782 | 4/1967 | Springmann et al. | 260/77.5 D |
| 3,453,184 | 7/1969 | Gemassmer et al. | 260/77.5 D |
| 3,689,462 | 9/1972 | Maximorich et al. | 260/77.5 D |

FOREIGN PATENT DOCUMENTS 820603 9/1959 United Kingdom ............... 260/77.5 D

OTHER PUBLICATIONS

DOS 1,495,299, Springmann et al., Jan. 2, 1969.
DOS 2,523,352, Buysch et al., Dec. 9, 1976.

*Primary Examiner*—H. S. Cockeram
*Attorney, Agent, or Firm*—Wolf, Greenfield & Sacks

[57] ABSTRACT

A process for preparing linear polycarbonates containing terminal hydroxyl groups with the essential exclusion of other terminal groups by reacting glycols having a carbon number > 4 and cyclic esters of carbonic acid via ester interchange reaction at 100–300° C and 0.1 – 300 mm Hg.

14 Claims, No Drawings

PROCESS FOR PREPARING POLYCARBONATES

RELATED APPLICATION

This application is a continuation of U.S. application Ser. No. 739,456, filed Nov. 8, 1976 and now abandoned.

BACKGROUND OF THE INVENTION

Polycarbonates have previously been produced from glycols by reacting with phosgene or bis-chloroformates followed by removal of hydrochloric acid from the reaction vessel. Polycarbonates prepared by the condensation of glycols and dialkyl carbonates have been described by Carothers and others. Alkaline catalysts were used and the alcohol by product removed by heating.

Glycols have also been esterified with diaryl carbonates in the absence of catalyst whereby phenols or substituted phenols are distilled off. Polycarbonates have also been manufactured by polycondensation of bisalkyl or bisaryl carbonates of dihydroxy compounds.

Polycarbonates produced by these methods may have a functionality less than two due to inadequate or incomplete esterifiction or transesterification which often prevents the products from forming high molecular weight polymers by subsequent reactions.

Polycarbonates have also been prepared by polymerization of ethylene carbonates under pressure using basic catalysts and a minor amount of glycol as initiator. These products are low in carbonate and high in ether groups concentration due to decomposition of the ethylene carbonate.

It has been reported that polycarbonates can be prepared by the ester interchange reaction of a glycol and an alkylene carbonate, for example, ethylene carbonate, only in the presence of alkaline or acid catalysts. These catalysts remain in the polycarbonate and can have an adverse effect on quality.

It is an object of this invention to provide an efficient process for preparing polycarbonates.

Another object of this invention is to provide methods of making high molecular weight polycarbonates with desired functionality and having good quality without inherently incorporated unwanted catalyst traces.

Still another object of this invention is to provide methods in accordance with the preceding objects which can be carried out in commercial production facilities at reasonable rates with good repeatability.

SUMMARY OF THE INVENTION

The present invention relates to a novel process for preparing linear polycarbonates having terminal hydroxyl groups, hereinafter called polycarbonates, from glycols with number of carbon atoms >4 and cyclic esters of carbonic acid, hereinafter called alkylene carbonates, by ester interchange reaction with or without catalysts. More particularly, the ester interchange reaction is carried out with distillation under reduced pressure whereby the low boiling glycol by-product is removed. The amount of the glycol withdrawn controls the molecular weight of the product.

Preferably polycarbonates high in carbonate and low in ether group concentration are prepared by reacting cycloaliphatic or aliphatic diols containing from 4 to 40 and preferably 4 to 12 carbon atoms or polyoxyalkylene glycols containing 2 to 20 alkoxy groups per molecule, each alkoxy group containing 2 to 4 carbon atoms, with alkylene carbonates composed of a 5 to 7 membered ring in the mole ratio of 10 to 1 to 1 to 10 at temperatures between 100 and 300° C and pressures between 0.1 and 300 mm Hg in the presence of ester interchange catalysts or without any catalyst, while removing low boiling glycols by distillation.

According to the invention, the preparation of polycarbonates is conducted in two stages. In the first stage, cycloaliphatic or aliphatic glycols containing from 4 to 40 carbon atoms or polyoxyalkylene glycols containing from 2 to 20 alkoxy groups per molecule, each alkoxy group containing 2 to 4 carbon atoms, are reacted with alkylene carbonates composed of a 5 to 7 membered ring in a mole ratio of 1:10 to 10:1, preferably 1:3 to 3:1 to form a low molecular weight polycarbonate. The boiling points of the selected glycol should be at least 5° C above that of the glycol by-product which is generated from the selected alkylene carbonate during the ester interchange reaction. The lower boiling glycol is removed by distillation at temperatures ranging from 100° to 300° C, preferably 150° to 250° C and under reduced pressure ranging from 10 mm to 300 mm Hg, preferably 50 mm to 200 mm Hg. If desired ester interchange catalysts may be used. A fractionating column is used to separate by-product glycol from the reaction mixture. The by-product glycol is taken off at the top of the column and unreacted alkylene carbonate and reactant glycol returned to the reaction vessel as reflux. A current of inert gas or addition of an inert solvent may be used to aid in the removal of by-product glycol as it is formed. When the amount of by-product glycol obtained indicates the degree of polymerization of the polycarbonate is in the range of two to ten, the pressure is gradually reduced to 0.1 to 10 mm Hg and the unreacted glycol and alkylene carbonate are removed. This marks the beginning of the second stage of the reaction. In this stage the low molecular weight polycarbonate is condensed by distilling off glycol as it is formed at temperatures ranging from 100° to 300° C preferably 150° to 250° C and at a pressure of from 0.1 to 10 mm Hg until the desired molecular weight of polycarbonate is obtained.

Diols suitable for use in the present invention include aliphatic diols such as butanediol-1,4, pentanediol-1,5, neopentyl glycol, hexanediol-1,6, heptanediol-1,7, octanediol-1,8, 2-ethylhexanediol-1,6, 2,2,4-trimethylhexanediol-1,6, decanediol-1,10 hydrogenated dilinoleylglycol, hydrogenated dioleylglycol and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane and polyalkylene glycols. The diols used in the reaction may be a single diol or a mixture of diols depending on the properties desired in the finished product.

Alkylene carbonates suitable for use in the invention have the general structure

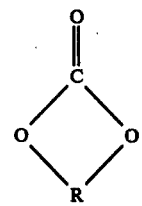

in which R is saturated divalent radical containing 2 to 4 linear carbon atoms, such as ethylene, trimethylene, tetramethylene, 1,2-propylene, 1,2-butylene, 1,3-butylene, 2,3-butylene, 1,2-pentylene, 1,3-pentylene, 1,4-pentylene, 2,3-pentylene, and 2,4-pentylene.

According to the invention, the polymerization can be carried out in the absence of catalyst. However, the reaction is accelerated with the use of a catalyst, such as a basic or neutral ester interchange catalyst. Among catalysts suitable for this purpose are such metals as lithium, sodium, potassium, rubidium, cesium, magnesium, calcium, strontium, barium, zinc, aluminum, titanium, cobalt, germanium, tin, lead, antimony, arsenic and cerium as well as the alkoxides thereof. Additional suitable catalysts are, by way of example, the carbonates of alkali and alkaline earth metals, zinc borate, lead borate, zinc oxide, lead silicate, lead arsenate, litharge, lead carbonate, antimony trioxide, germanium dioxide, cerium trioxide, and aluminum isopropoxide. The catalysts that are particularly useful and therefore preferred are organometallic compounds such as salts of organic acids of magnesium, calcium, cerium, barium, zinc, tin and titanium. Catalyst concentrations between about .0001% and 1.0%, based on the weight of the starting materials are suitable. The preferred range is from .001 to 0.2%.

The invention is further illustrated but is not intended to be limited by the following examples.

EXAMPLE I

A 2-liter, four-neck, round bottom flask equipped with a stirrer, thermometer, packed distillation column and feeding funnel is charged with 1,000 parts 1,6-hexanediol and 400 parts ethylene carbonate. The mixture is heated and distilled under the reduced pressure of about 120 mm Hg. The distillate is collected at about 145° C to about 150° C. Another 700parts of ethylene carbonate is slowly added through the feeding funnel to the reaction mixture so that the reaction temperature is maintained at about 200° C to about 205° C. About 570 parts of distillate is obtained. The pressure is then reduced to about 25mm Hg and the unreacted materials is distilled off with the external temperature at about 200° C to about 205° C. About 250 parts more of distillate is collected. Final distillation is carried out at 3mm Hg and the extenral temperature is raised to about 220° C. About 103 parts more of distillate is collected. The residue has an OH number of about 66 and melting point of about 37° C to about 38° C.

EXAMPLE II a 1-liter, four-neck round bottom flask equipped with a stirrer, thermometer, packed distillation column, and nitrogen inlet tube is charged with 500 parts of 1,6-hexanediol, 500 parts ethylene carbonate and 1 part stannous octoate catalyst. The mixture is heated in a current of nitrogen and maintained at a pressure of about 150mm Hg. The distillation takes place and the distillate is collected at about 150° C to about 155° C. About 300 parts of distillate is obtained. The pressure is then reduced to about 50mmHg and the distillation is continued at about 125° C to about 130° C. About 70 parts more of distillate are obtained. Final distillation is carried out under the conditions of about 2mm Hg and about 220° C external temperature for 2 hours. About another 26 parts of distillate is obtained. The residue has an OH number of about 49 and melting point of about 47° C to about 48° C.

EXAMPLE III

A 500 ml three neck round bottom flask equipped with a stirrer, thermometer and packed column is charged with 225 parts of butanediol-1,4, 204 parts of propylene carbonate and 0.4 parts of a 10% tetrabutyl titanate solution in toluene. The mixture is heated at 150°–160° C at a pressure of about 65 mm Hg. and the distillate is collected to about 118° C. The distillation is continued until about 130 parts of distillate is collected. Unreacted butanediol and propylene carbonate are then removed by distilling at 160°–180° C and 35 mm Hg pressure. About 96 parts of product is obtained which has a hydroxyl number of 200.

EXAMPLE IV

A 500 ml. 3 neck round bottom flask equipped with stirrer, thermometer and packed column is charged with 165 parts of 1,5-pentanediol and 187 parts of ethylene carbonate and 6.4 parts of a 1% solution of calcium octoate in toluene. The mixture of reactants are heated at 160–210° C under a pressure of 100 mm Hg. Ninety-eight parts of distillate is collected at 140°–145° C. The pressure was then reduced to 2 mm Hg and the distillation continued until the flask temperature reached 230° C. Forty-eight parts of distillate were collected. One hundred seventy-seven parts of high viscosity liquid having a hydroxyl number of 25 were obtained as product.

EXAMPLE V a 2 liter, 4 neck round bottom flask, equipped with stirrer, thermometer, packed column and nitrogen inlet tube was charged with 1000 parts of cyclohexanedimethanol, 1000 parts of ethylene carbonate and 3.6 parts of 10% calcium octoate in toluene. The reaction mixture is distilled at 220–250° C at atmospheric pressure for 3 hours. About 250 parts of low boiling material was collected. Two hundred fifty more parts of ethylene carbonate were added to the reaction vessel. The reaction is continued at a pressure of 100 mm Hg and 180parts of distillate collected at 180–210° C. The pressure is then reduced to 4 mm Hg and 320 parts of distillate collected at 140–230° C. About 1730 parts of product were obtained having a hydroxyl number of 72.

EXAMPLE VI

A 2 liter, 4 neck round bottom flask, equipped with stirrer, thermometer, packed column and nitrogen inlet tube was charged with 450 parts of diethylene glycol, 610parts of cyclohexanedimethanol, 1000 parts of ethylene carbonate and 2 parts of 20% calcium octoate in toluene. The reaction was carried out at 160–220° C and 100 mm Hg pressure. Four hundred fifty parts of distillate was collected at 135–143° C. The flask was then cooled to 140° C and the pressure reduced to about 5 mm Hg. The distillation was continued until the reaction temperature reached 232° C. About 420 parts of distillate was collected. Nine hundred forty parts of product having a hydroxyl number of 56 was obtained. The reactions carried out in the process of this invention are exemplified in the following equations:

Main reaction:

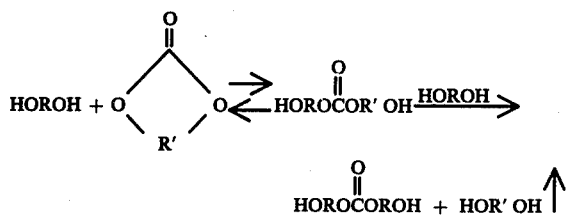

Side reactions:

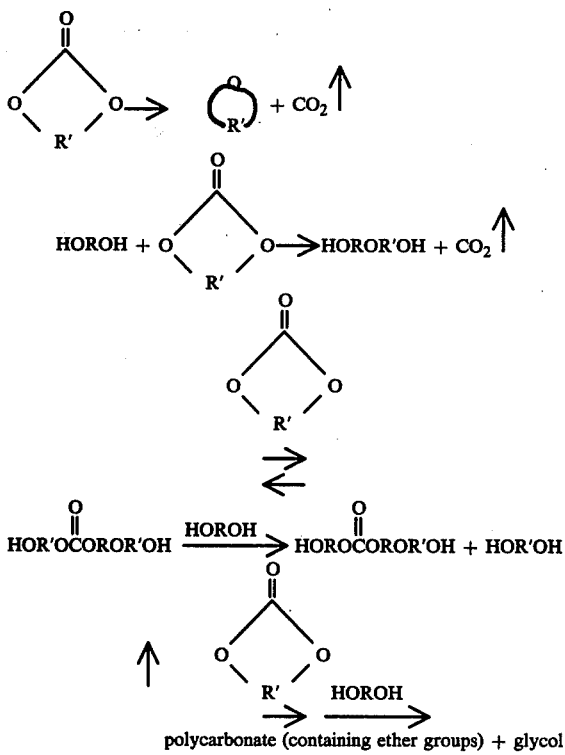

Overall reaction:

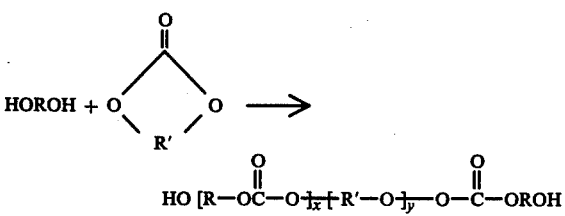

x is from 2 to 35
y is 0, 1 or 2
R = 4 to 40 carbon atoms cycloalihatic or aliphatic or 2-20 alkoxy group
R' = 2 to 4 carbon linear carbons with or without additional pendant carbon groups The polycarbonates produced have molecular weights of from 200 to 4,000. They are useful as polymer intermediates to react with other materials such as organic polyisocyanates to form polyurethanes of high molecular weight and superior properties. They may be foamed or unfoamed, elastomeric or rigid, as desired, and they are useful as coating materials. In addition, the polycarbonates of the invention are suitable as plasticizers in various resins, such as vinyl chloride vinyl acetate resins, natural rubber, GRS rubber and other copolymers.

We claim:

1. A process of preparing linear polycarbonates containing terminal hydroxyl groups, said process comprising,
   reacting an alkylene carbonate composed of a 5 to 7 membered ring with a hydroxy compound selected from the group consisting of cycloaliphatic diols and aliphatic diols containing from 4 to 40 carbon atoms, and polyoxyalkylene glycols containing from 2 to 20 alkoxy groups er molecule with each alkoxy group containing from 2 to 4 carbon atoms,
   said hydroxy compound having a boiling point greater than 4.9° C over the by-product formed in ester interchange reaction with said alkylene carbonate,
   said hydroxy compound and alkylene carbonate being admixed in a molar ratio of 10 to 1, to 1 to 10,
   said reaction being carried out at temperatures between 100° C and 300° C and pressures between 0.1 and 300 Hg in a first and second stage wherein low molecular polycarabonate is formed in a first stage at a molecular chain length of from 2 to 10 units while distilling off by-product glycol from the reaction mixture, and then removing unreacted hydroxyl compound and alkylene carbonate and beginning a second stage which comprises condensing the low molecular weight polycarbonate by distilling off all glycol formed at temperatures of from 100 to 300° C to form high molecular weight polycarbonate.

2. A process in accordance with claim 1 wherein said reactants are mixed in substantially molar ratios of hydroxy compounds to alkylene carbonate of from 1:10 to 10:1,
   and said first stage is carried out at 150° C to 250° C and pressures of from 50 mm to 200 mm Hg.

3. A process in accordance with claim 2 wherein said second stage is carried out at a pressure of from 0.1 mm to 10 mm Hg.

4. A process in accordance with claim 1 wherein said high molecular linear polycarbonates having molecular weights of from 200 to 4,000.

5. A process in accordance with the process of claim 4 wherein said second stage is carried out at a pressure of from 0.1 mm to 10 mm Hg.

6. A process in accordance with the process of claim 1 wherein said reactants are mixed in substantially molar ratios of hydroxy compounds to alkylene carbon of from 1:3 to 1:1, and said first state is carried out at 150° C to 250° C and pressures of from 50 mm to 200 mm Hg.

7. A process in accordance with claim 1 wherein said alkylene carbonate is ethylene carbonate.

8. A process in accordance with claim 4 wherein said alkylene carbonate is ethylene carbonate.

9. A process in accordance with the process of claim 7 and said hydroxy compound is 1,6-hexane diol.

10. A process in accordance with the process of claim 8 and said hydroxy compound is 1,6-hexane diol.

11. A process in accordance with the process of claim 3 wherein said alkylene carbonate is ethylene carbonate and said hydroxy compound is 1,6-hexane diol.

12. A process in accordance with the process of claim 11 wherein said high molecular linear polycarbonates have molecular weights of from 200 to 4,000.

13. A product by the process of claim 1.

14. A product of claim 13 wherein said high molecular weight polycarbonate has a molecular weight in the range of from 200 to 4,000.

* * * * *

UNITED STATES PATENT OFFICE
CERTIFICATE OF CORRECTION

Patent No. 4,131,731            Dated 12/26/78

Inventor(s) Kwo-Hrong Lai et al

It is certified that error appears in the above-identified patent and that said Letters Patent are hereby corrected as shown below:

Column 3; line 46, correct "extenral" to --external--;
Column 3; line 52, cancel "a" and substitute --A--.

Column 4; line 16, after "ml" change "." to --,--;
Column 4; line 35, cancel "a" and substitute --A--.

Column 5; line 54, cancel "cycloalihatic" and substitute --cycloaliphatic--.

Column 6; line 10, change "er" to --per--;
Column 6; line 20, after "300" add --mm--;
Column 6; line 21, correct "polycarabonate" to read --polycarbonate--;
Column 6; line 48, correct "state" to read --stage--;
Column 6; line 64, in claim 13, after "product" add --produced--.

Signed and Sealed this

Twenty-fifth Day of September 1979

[SEAL]

*Attest:*

LUTRELLE F. PARKER

*Attesting Officer*     *Acting Commissioner of Patents and Trademarks*